Dec. 11, 1956  J. E. CONWAY  2,773,615
CARGO LOADING ATTACHMENT FOR FORK TRUCKS
Filed Jan. 18, 1955
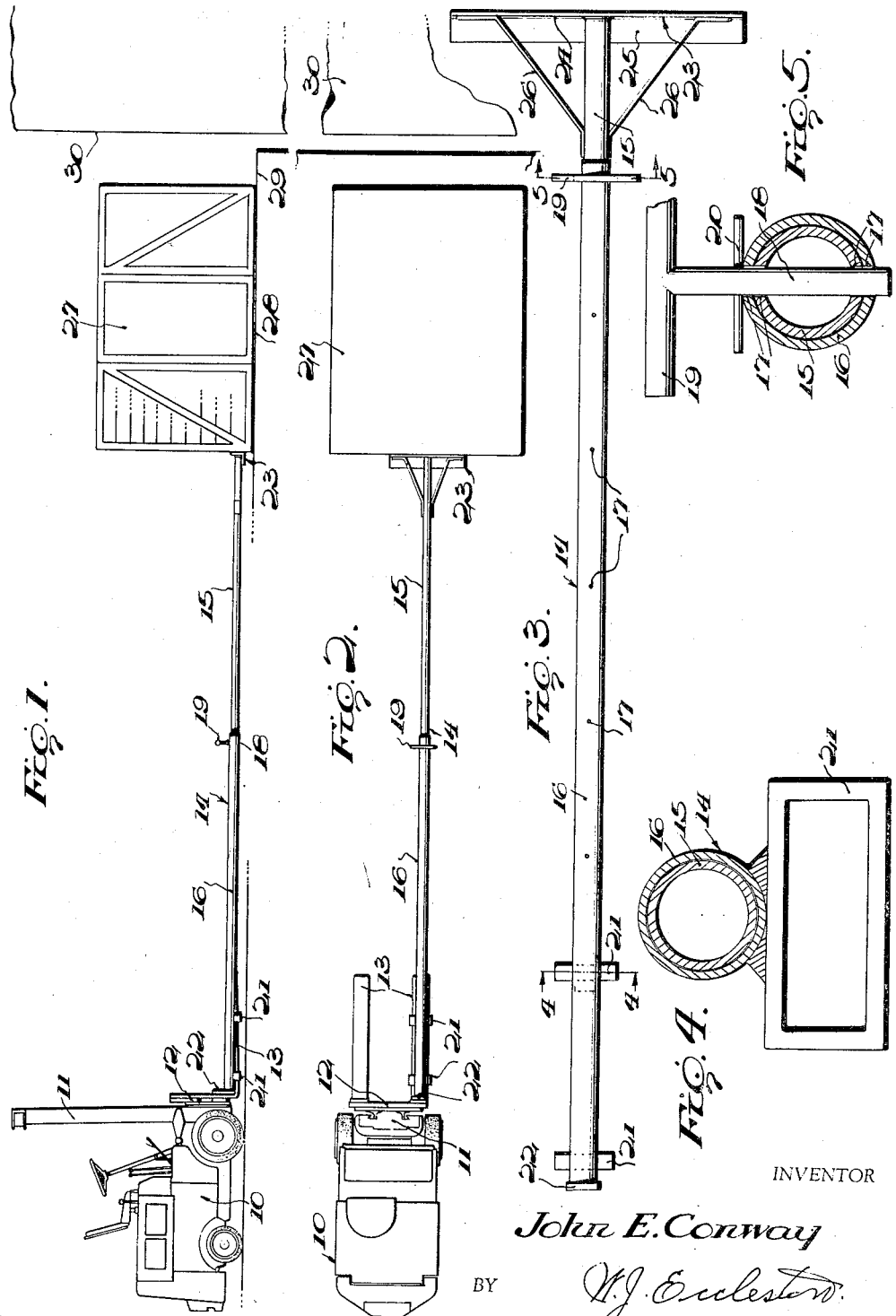
INVENTOR
John E. Conway
BY
W. J. Eccleston
ATTORNEY.

United States Patent Office 2,773,615
Patented Dec. 11, 1956

2,773,615

CARGO LOADING ATTACHMENT FOR FORK TRUCKS

John E. Conway, Mechanicsburg, Pa.

Application January 18, 1955, Serial No. 482,681

1 Claim. (Cl. 214—620)

(Granted under Title 35, U. S. Code (1952), sec. 266)

The invention described herein, if patented, may be manufactured and used by or for the Government for governmental purposes, without the payment to me of any royalty thereon.

My invention relates to an attachment for fork-lift trucks and the like.

A primary object of the invention is to provide an attachment for a fork-lift truck which will enable the truck to push cargo to the forward end of long trailer truck bodies or the like.

Another object is to provide an attachment of the above mentioned character which is adjustable to different lengths, so as to vary the distance between the truck and the load or cargo being pushed by the truck.

A further object is to provide in an attachment of the above-mentioned character novel and simplified means for detachably connecting the attachment to a lifting fork or tine of the fork-lift truck.

A still further object of the invention is to provide a device of the above-mentioned character which is rugged and durable in construction, highly simplified and cheap to manufacture.

Other objects and advantages of the invention will be apparent during the course of the following description.

In the accompanying drawings, forming a part of this application, and in which like numerals are employed to designate like parts throughout the same, Figure 1 is a side elevation of a fork-lift truck attachment in accordance with my invention and illustrating the use of the same for pushing heavy skid mounted cargo;

Figure 2 is a plan view of the device shown in Figure 1;

Figure 3 is an enlarged plan view of the attachment removed from the fork-lift truck;

Figure 4 is an enlarged transverse vertical section taken on line 4—4 of Figure 3, and, Figure 5 is a similar section taken on line 5—5 of Figure 3.

In the drawings, where for the purpose of illustration is shown a preferred embodiment of the invention, the numeral 10 designates generally a conventional fork-lift truck including at its forward end the usual substantially vertical mast 11. The usual lifting carriage 12 is mounted upon the mast 11 for vertical movement, and a pair of laterally spaced horizontal lifting forks or tines 13 are rigidly secured to the carriage 12 for movement therewith and extend forwardly longitudinally thereof in the usual manner. The construction of the truck 10 is entirely conventional and well known, and need not be discussed in further detail in the present application.

My cargo loading attachment is designated generally by the numeral 14 and comprises forward and rear elongated telescoping bars or sections 15 and 16 of considerable length, as shown, with the forward bar 15 preferably telescopically engaged within the bore of the rear bar 16. Both the forward and rear bars 15 and 16 are preferably tubular, for the sake of lightness, and the forward and rear bars 15 and 16 may be of approximately the same length.

The forward and rear bars 15 and 16 are provided with a series of longitudinally equidistantly spaced openings 17 extending transversely therethrough, and with the openings of the two bars adapted to register when the bars are adjusted longitudinally of each other the desired amounts.

In order to releasably lock the telescoping bars 15 and 16 in selected longitudinally adjusted positions, I provide a readily removable pin 18 for insertion through any registering pair of the openings 17 of the bars 15 and 16, as best shown in Figure 5. Pin 18 is preferably provided at its upper end with a transverse handle 19, and below this handle with a transverse stop element or lug 20, rigidly secured thereto and adapted to engage the upper side of the bar 16 when the pin is inserted into the openings 17. The lug 20 limits the downward movement of the pin 18, and maintains the handle 19 spaced above the top of the bar 16 a convenient distance for grasping with the hand.

Near its rear end, the rear bar 16 is provided at its lower side with a pair of longitudinally spaced fork-engaging members or sleeves 21, rigidly secured thereto in longitudinally spaced aligned relation by welding or the like. The sleeves 21 are preferably rectangular in cross section so as to conform to the cross sectional shape of the fork 13 of the lift truck. The aligned sleeves 21 are of a size to engage readily over one of the forks 13 in the manner shown, and the spacing between the sleeves 21 is such that the two sleeves will be arranged near the forward and rear ends of the fork 13 when my attachment is applied to the lift truck. The sleeves 21 preferably fit the fork 13 with only enough clearance to allow the attachment to be readily applied to and removed from the fork 13, but without any appreciable play or movement between the fork and attachment 14 after the attachment is mounted upon the fork.

In assembly, the rear bar 16 lies directly above the particular fork 13 to which the attachment is applied, Figure 2, and the sleeves 21 slip over the fork directly beneath the bar 16. The vertically disposed foot plate or member 22 is rigidly secured by welding or the like to the rear end of the bar 16, for abutting engagement with the forward face of the vertically shiftable carriage 12 when the attachment 14 is applied to the truck.

At its forward end, the forward bar 15 has a transverse rigid pusher bar or member 23 rigidly secured thereto by welding or the like, and preferably extending equidistantly beyond opposite sides of the bar 15. The member 23 is preferably L-shaped in cross section, as shown, with its vertical web 24 arranged forwardmost and welded directly to the forward end of the bar 15. The horizontal web 25 of the member 23 is preferably arranged lowermost and is disposed below the bar 15 and welded directly to the bottom of the bar near its forward end. A pair of diagonal braces 26 are preferably provided with their ends rigidly secured by welding or the like to the sides of the forward bar 15 and rear face of the vertical web 24, as shown in the drawings.

The attachment 14 is longitudinally adjustable over a considerable range, due to the arrangement of the openings 17 and because the forward bar 15 may telescope inside of the bar 16 throughout the major portion of its length as shown in Figure 3. It is preferred that the overall length of the attachment 14 when extended the maximum amount be in the neighborhood of thirty feet, although this length is not critical, and the dimensions of the attachment may be varied somewhat to meet particular requirements.

In use, the attachment 14 is applied to one of the forks 13 in the manner shown and described, and the length of the attachment is adjusted as required through the medium of the registering openings 17 and removable pin 18. The overall adjusted length of the attachment will be determined, for example, by the length of the trailer truck body into which it is desired to push cargo by means of the truck 10.

A particular piece of cargo such as indicated by the numeral 27 in the drawings, mounted on skids 28 may be resting upon a loading platform 29 adjacent to the rear end of a trailer truck body 30. The truck 10 may be driven upon the platform 29, as shown in Figure 1, with the loading attachment 14 adjusted to the desired length and locked in the adjusted position by the pin 18. The thus adjusted attachment 14 extends horizontally forwardly of the truck 10 for a substantial distance, such as 25 or 30 feet, and the attachment is carried bodily by the fork 13, as shown. The carriage 12 is adjusted vertically in the desired manner and the truck is advanced until the transverse pusher member 23 engages the cargo 27 at its rear end. The cargo may be engaged by the member 23 near its bottom, as shown in Figure 1, or at any other suitable elevation deemed best by the operator. Continued forward movement by the truck 10 will push the cargo 27 from the loading platform 29 into the rear end of the truck body 30 and forwardly to the front of the truck body. By this means, it will be unnecessary for the fork truck 10 to move off of the platform 29 and to enter the truck body 30, which is undesirable. Other cargo may be loaded into the truck body by means of my attachment and the fork truck in the manner described, and the attachment 14 may be lifted by the carriage 12 to the desired elevation when engaging cargo of different sizes and weight.

When the truck 10 may be operating on the ground or below the elevation of the platform 29, the carriage 12 and attachment 14 may be raised to some point near the top of the mast 11 so that the cargo loading operation may still be performed satisfactorily.

I wish to emphasize that my attachment is designed particularly for use with standard types of fork-lift trucks, and requires absolutely no modification of the construction of the truck or its lifting forks to accommodate the attachment. The foot plate 22 bearing directly against the carriage 12 transmits the load directly against the carriage 12, and the fork 13 does not bear the thrust or load induced by pushing the cargo, but merely supports the weight of the attachment 14.

It is to be understood that the form of the invention herewith shown and described is to be taken as a preferred example of the same, and that various changes in the shape, size and arrangement of parts may be resorted to, without departing from the spirit of the invention or the scope of the subjoined claim.

I claim:

A cargo loading attachment for a fork-lift truck comprising a pair of elongated bars having telescopic engagement, said bars having a series of longitudinally spaced transverse openings adapted to register, a pin for engagement with a selected registering pair of said openings for releasably locking said bars in the selected longitudinally adjusted position, a pair of rectangular sleeve elements secured to one side of one of said bars in spaced aligned relation near one end of the last named bar and adapted to receive one fork of the truck, an abutment plate secured to the end of the last named bar adjacent said sleeve members for engagement with the lifting carriage of the truck, and a transverse pusher member secured to the end of the other bar which is remote from the bar having said sleeve members.

References Cited in the file of this patent

UNITED STATES PATENTS

| | | |
|---|---|---|
| 2,431,589 | Shuler | Nov. 25, 1947 |
| 2,477,167 | Bliss | July 26, 1949 |
| 2,490,772 | Benner | Dec. 13, 1949 |
| 2,536,068 | Lehmann | Jan. 2, 1951 |
| 2,579,409 | White | Dec. 18, 1951 |
| 2,629,507 | Olson | Feb. 24, 1953 |
| 2,684,164 | Violette | July 20, 1954 |
| 2,709,017 | Ulinski | May 24, 1955 |
| 2,714,463 | Fraser | Aug. 2, 1955 |